(12) United States Patent
Eschenauer et al.

(10) Patent No.: US 7,486,795 B2
(45) Date of Patent: Feb. 3, 2009

(54) METHOD AND APPARATUS FOR KEY MANAGEMENT IN DISTRIBUTED SENSOR NETWORKS

(75) Inventors: Laurent Eschenauer, Ougree (BE); Virgil D. Gligor, Chevy Chase, MD (US)

(73) Assignee: University of Maryland, College Park, MD (US)

( * ) Notice: Subject to any disclaimer, the term of this patent is extended or adjusted under 35 U.S.C. 154(b) by 619 days.

(21) Appl. No.: 10/666,207

(22) Filed: Sep. 18, 2003

(65) Prior Publication Data

US 2005/0140964 A1    Jun. 30, 2005

Related U.S. Application Data

(60) Provisional application No. 60/411,864, filed on Sep. 20, 2002.

(51) Int. Cl.
*H04L 9/00* (2006.01)
(52) U.S. Cl. .................. 380/277; 380/278; 380/279
(58) Field of Classification Search ......... 380/277–280, 380/283, 285–286, 44, 45, 255, 270, 269, 380/259; 713/163, 150, 168, 169; 455/410, 455/411
See application file for complete search history.

(56) References Cited

U.S. PATENT DOCUMENTS

| | | | | |
|---|---|---|---|---|
| 5,455,865 A | * | 10/1995 | Perlman | 713/153 |
| 5,748,736 A | * | 5/1998 | Mittra | 713/163 |
| 6,240,188 B1 | * | 5/2001 | Dondeti et al. | 380/284 |
| 6,295,361 B1 | * | 9/2001 | Kadansky et al. | 380/278 |
| 6,373,946 B1 | * | 4/2002 | Johnston | 380/211 |
| 6,438,550 B1 | * | 8/2002 | Doyle et al. | 707/9 |
| 6,539,093 B1 | * | 3/2003 | Asad et al. | 380/279 |

(Continued)

OTHER PUBLICATIONS

"An Optimal Class of Symmetric key generation systems"—Rolf Blom 1998.*

(Continued)

*Primary Examiner*—Kimyen Vu
*Assistant Examiner*—Nirav Patel
(74) *Attorney, Agent, or Firm*—Rosenberg, Klein & Lee

(57) ABSTRACT

In a distributed sensor network, a method of key management is carried out in several phases, particularly key pre-distribution phase, shared key discovery phase, and as needed, a path key establishment phase. In the key pre-distribution phase, prior to DSN deployment, a ring of keys is distributed to each sensor node, each key ring consisting of randomly chosen keys from a large pool of keys which is generated off-line. A shared key exists between each two key rings with a predetermined probability. In the shared key discovery phase, which takes place upon deployment of the DSN, every sensor node discovers its neighbors in wireless communication range with which it shares keys, and the topology of the sensor array is established by forming secure communication links between respective sensor nodes. The path key establishment phase assigns a path key to selected pairs of sensor nodes in wireless communication range that do not share a key but are connected by two or more links at the end of the shared key discovery phase. The key management scheme also assumes a revocation phase for removal of the key ring of the compromised sensor node from the network. Also, re-keying phase is assumed for removal of those keys with the expired lifetime.

19 Claims, 8 Drawing Sheets

U.S. PATENT DOCUMENTS

| | | | | |
|---|---|---|---|---|
| 6,584,566 | B1* | 6/2003 | Hardjono | 713/163 |
| 6,650,753 | B1* | 11/2003 | Lotspiech et al. | 380/277 |
| 6,694,025 | B1* | 2/2004 | Epstein et al. | 380/279 |
| 6,748,528 | B1* | 6/2004 | Greenfield | 713/151 |
| 6,788,788 | B1* | 9/2004 | Kasahara et al. | 380/277 |
| 6,839,436 | B1* | 1/2005 | Garay et al. | 380/278 |
| 6,941,457 | B1* | 9/2005 | Gundavelli et al. | 713/163 |
| 6,993,138 | B1* | 1/2006 | Hardjono | 380/281 |
| 7,020,701 | B1* | 3/2006 | Gelvin et al. | 709/224 |
| 7,043,024 | B1* | 5/2006 | Dinsmore et al. | 380/278 |
| 7,068,789 | B2* | 6/2006 | Huitema et al. | 380/277 |
| 7,080,255 | B1* | 7/2006 | Kasahara et al. | 713/182 |
| 7,120,696 | B1* | 10/2006 | Au et al. | 709/229 |
| 7,234,063 | B1* | 6/2007 | Baugher et al. | 713/189 |
| 2002/0146127 | A1* | 10/2002 | Wong | 380/270 |
| 2003/0002680 | A1* | 1/2003 | Akiyama et al. | 380/278 |
| 2003/0021418 | A1* | 1/2003 | Arakawa et al. | 380/277 |
| 2003/0044017 | A1* | 3/2003 | Briscoe | 380/277 |
| 2003/0065941 | A1* | 4/2003 | Ballard et al. | 713/201 |
| 2003/0081785 | A1* | 5/2003 | Boneh et al. | 380/277 |
| 2003/0133576 | A1* | 7/2003 | Grumiaux | 380/279 |
| 2004/0054891 | A1* | 3/2004 | Hengeveld et al. | 713/163 |

OTHER PUBLICATIONS

C. Blundo, A. DeSantis, A. Herzberg, S. Kutten, U. Vaccaro and M. Yung, "Perfectly Secure Key Distribution for Dynamic Conferences," in Advances in Cryptology—CRYPTO.

C. Blundo, L.A. Frota Mattos and D.R. Stinson, Tradeoffs Between Communication and Storage in Unconditionally Secure Schemes for Broadcast Encryption and Interactive K.

A. Fiat and M. Naor, "Broadcast Encryption," in Advances in Cryptology—CRYPTO '93, LNCS 773, Springer-Verlag, Berlin, Aug. 1993, pp. 480-491.

J. Hill, R. Szewczyk, A. Woo, S. Hollar, D. Culler, K. Pister, "System architecture directions for network sensor," Proc. Of ASPLOS-IX, Cambridge, Mass. 2000.

V.D. Gligor and P. Donescu, "Fast Encryption and Authentication: XCBC Encryption and XECB Authentication Modes," Fast Software Encryption 2001, M. Matsui (ed), LNCS 235.

C.S. Jutla, "Encryption Modes with Almost Free Message Integrity," Advances in Cryptology—Eurocrypt 2001, B. Pfitzmann (ed.), LNCS 2045, Springer Verlag, May 2001.

J.M. Kahn, R.H. Katz and K.S.J. Pister, "Mobile Networking for Smart Dust," ACM/IEEE Intl. Conf. on Mobile Computing and Networking (MobiCom 99), Seattle, WA, Aug. 17-.

P. Rogaway, M. Bellare, J. Black, and T. Krovetz, "OCB: A block-Cipher Mode of Operations for Efficient Authenticated Encryption," Proc. of the 8th ACM Conf. on Computer.

S.R. White and L. Comerford, "ABYSS: An Architecture for Software Protection," IEEE Transactions on Software Engineering, vol. 16, No. 6, Jun. 1990, pp. 619-629.

* cited by examiner

US 7,486,795 B2

METHOD AND APPARATUS FOR KEY MANAGEMENT IN DISTRIBUTED SENSOR NETWORKS

REFERENCE TO RELATED APPLICATIONS

This Utility Patent Application is based on Provisional Patent Application No. 60/411,864 filed on 20 Sep. 2002.

This invention was made with Government Support under Contract No. DAAD19-01-1-0494 and DAAD19-01-2-0011 awarded by U.S. Army Research Office/U.S. Army Research Laboratory. The Government has certain rights in the invention.

FIELD OF THE INVENTION

The present invention is related to distributed sensor networks, and more particularly, to cryptographic protection of communication associated with distributed sensor networks.

In overall concept, the present invention relates to a key management scheme designed to satisfy both operational and security requirements of distributed sensor networks which includes selective distribution of keys to sensor nodes, sensor capture detection, key revocation and sensor disabling, as well as node re-keying without substantial computation and extended communication capabilities.

The present invention further is related to a key management technique which relies on probabilistic key sharing among the sensor nodes prior to the deployment of the distributed sensor network. The invention system uses simple protocols for shared-key discovery and path-key establishment to permit key revocation, re-keying and incremental addition of nodes when needed.

BACKGROUND OF THE INVENTION

Recent advances in electronic and computer technologies have paved the way for the proliferation of wireless networks, e.g., distributed sensor networks which are mobile networks that include sensor nodes with limited computation and communication capabilities. Each sensor node is battery-powered and equipped with integrated sensors, data processing capabilities, and short range radio communications. Distributed sensor networks are dynamic in the sense that they allow addition and deletion of sensor nodes after deployment in a random manner over a terrain under scrutiny to expand the network or replace failing and unreliable sensor nodes. Distributed sensor networks may be deployed in hostile areas where communication is monitored and nodes are subject to capture and surreptitious use by an adversary. Hence, distributed sensor networks require cryptographic protection of communications, sensor capture detection, key revocation and sensor disabling.

Distributed sensor networks (DSNs) share several characteristics with the more traditional embedded wireless sensor networks (WSNs). Both include arrays of sensor nodes that are battery powered, have limited computational capabilities and memory, and rely on intermittent wireless communication via radio frequency and, possibly, optical links. Both include data-collection nodes, which cache sensor data and make it available for processing to application components of the network, as well as control nodes which monitor the status of and broadcast simple commands to sensor nodes. Although in both networks most nodes have limited, if any, mobility after deployment, some nodes are highly mobile (e.g., data collection and control nodes placed on humans, vehicles, aircraft).

However, distributed sensor networks (DSNs) differ from the traditional embedded wireless networks in several important areas, namely: their scale is orders of magnitude larger than that of embedded wireless networks (e.g., tens of thousands in DSNs as opposed to just tens of sensor nodes in WSNs); they are dynamic in the sense that they allow addition and deletion of sensor nodes after deployment to extend the network or replace failing and unreliable nodes without physical contact; and they may be deployed in hostile areas where communication is monitored and sensor nodes are subject to capture and manipulation by an adversary. These challenging operational requirements place equally challenging security constraints on DSN design.

Communication Security Constraints. The capabilities of the sensor nodes for large-scale DSNs range from those of Smart Dust sensors that have only 8 Kb of program and 512 bytes for data memory, and processors with 32 8-bit general registers that run at 4 MHz and 3.0V (e.g., the ATMEL 90LS8535 processor), to sensors that are over an order of magnitude more capable in terms of processing speed (e.g., the MIPS R4000 processors) and memory capacity. The power, energy and the related computational and communication limitations of nodes in this range make it impractical to use typical asymmetric (public-key) cryptosystems to secure communications. For example, in D. W. Carman, P. S. Kruus and B. J. Matt, "Constraints and Approaches for Distributed Sensor Network Security", dated Sep. 1, 2000. NAI Labs Technical Report #00-010, available at http://download.nai.com/products/media/nai/zip/nailabs-report-00-010-final.zip, it is reported that on a mid-range processor, such as the Motorola MC68328 "DragonBall", the energy consumption for a 1024-bit RSA encryption (signature) operation is much higher than that for a 1024-bit AES encryption operation; i.e., about 42 mJ (840 mJ) versus 0.104 mJ. Further, the energy consumption for transmitting a 1024-bit block over a distance of approximately 900 meters using a typical communication subsystems such as Sensoria WINS NG RF at 10 Kbps and 10 mW of power is about half that of RSA encryption (i.e., 21.5 mJ) and even less for reception (14.3 mJ). Substantially less energy is spent to communicate over smaller distances, since power is proportional to the square of the distance. Also, in the range of sensor capabilities, symmetric-key ciphers and hash functions are between two to four orders of magnitude faster than digital signatures. Hence, symmetric-key ciphers, low-energy, authenticated encryption modes, and hash functions are advantageous in protecting DSN communications.

Key Management Constraints. Traditional Internet style key exchange and key distribution protocols based on infrastructures using trusted third parties are impractical for large scale DSNs because of the unknown network topology prior to deployment, communication range limitations, intermittent sensor-node operation, and network dynamics. To date, the only practical options for the distribution of keys to sensor nodes of large-scale DSNs whose physical topology is unknown prior to deployment would be to rely on key pre-distribution. Keys would have to be installed in sensor nodes to accommodate secure connectivity between nodes. However, traditional key pre-distribution offers two inadequate solutions: either a single mission key or a set of separate keys, each being pair-wise privately shared with another node, must be installed in every sensor node.

The single mission-key solution is inadequate since the capture of any sensor node may compromise the entire DSN due to the fact that selective key revocation is impossible upon sensor-capture detection. In contrast, the pair-wise private sharing of keys between every two sensor nodes avoids wholesale DSN compromise upon node capture since selective key revocation becomes possible. However, this solution requires pre-distribution and storage of n−1 keys (n is the number of sensor nodes in the DSN) in each sensor node, and n(n−1)/2 per DSN, which renders it impractical for both intrinsic and technological reasons for DSNs using generally more than 10,000 nodes. Initially, pair-wise private key sharing between any two sensor nodes would be disadvantageous since direct node-to-node communication is achievable only in small node neighborhoods delimited by communication range and sensor density. Secondly, incremental addition and deletion as well as re-keying of sensor nodes would become both expensive and complex as they require multiple keying messages to be broadcast network-wide to all nodes during their non-sleep periods (i.e., one broadcast message for every added/deleted node or re-key operation). Third, a dedicated RAM memory for storing n−1 keys would push the on-chip, sensor-memory limits for the foreseeable future. Presently 64-bit, keys are used and would complicate fast key erasure upon detection of physical sensor tampering. Approximately 80 KB of dedicated key memory will have to be stored in RAM since keys can be dynamically added/deleted. This represents a substantial fraction of the on-chip RAM memories for the processors at the high end of the range considered.

It would be therefore highly desirable to have a simple key pre-distribution scheme that would require memory storage for only a few keys to a couple hundred keys and yet has similar security and superior operational properties when compared to those of the pair-wise private key sharing scheme.

SUMMARY OF THE INVENTION

It is therefore an object of the present invention to provide a key management scheme for Distributed Sensor Networks which relies upon probabilistic key sharing among the sensor nodes and which uses a simple shared-key discovery protocol for key distribution, revocation, and node re-keying.

It is another object of the present invention to provide a key management technique for Distributed Sensor Networks where a random pool of keys is selected from the key space, and each sensor node, prior to deployment on the terrain under the scrutiny is loaded with a random subset of keys (key ring) from the key pool and their key identifiers. In this manner, any two nodes which are able to find a common key within their respective key rings may use that key as their shared secret to initiate communication therebetween.

The present invention is envisioned as a method of key management in distributed sensor networks which comprises the steps of:

prior to deployment of a plurality of sensor nodes of the Distributed Sensor Network, storing in each sensor node, a respective key ring formed of randomly selected keys as well as their key identifiers, and upon deployment of the plurality of sensor nodes, searching by each sensor node for a "partner" sensor node which shares at least one key with each sensor node to establish a secure communication link between the sensor nodes.

Preferably, the key ring of each sensor node is formed by initially generating a key space; secondly, randomly selecting a pool of keys from the key space; and, thirdly, randomly selecting a distinct set of the keys from the pool of keys for each sensor node. Each two key rings, thus formed, contain with a predetermined probability at least one common key.

Prior to forming a plurality of key rings, all keys in the pool of keys are assigned a specific key identifier for being broadcast by sensor nodes in the shared key discovery phase of the key management scheme of the present invention.

The method further includes the steps of revoking a compromised sensor node, re-keying the sensor node, and/or adding new sensor nodes to the existing ones in order to provide a fully connected distributed sensor network.

The present invention may also be envisioned as a Distributed Sensor Network (DSN) system in which each sensor node is preloaded prior to deployment, with a respective key ring formed of randomly selected keys, as well as with their key identifiers. The key rings of respective two sensor nodes share, with a predetermined probability, at least one common key. Such a DSN system incorporates means associated with each sensor node for searching for another (neighboring) sensor node sharing the common key to establish a secure communication link therebetween.

Such a Distributed Sensor Network system further comprises several controller nodes, each sharing with the sensor nodes respective controller-sensor keys $K^{ci}$. The controller nodes contain key identifiers of the key ring of the sensor nodes and a specific sensor identifier of each sensor node. These key identifiers along with the sensor identifier are broadcast by the controller node when such a sensor node is being compromised. For this purpose, the Distributed Sensor Network system further includes processing means for generating a revocation message and broadcasting the same for removal of the compromised sensor node wherein the revocation message contains a signed list of the key identifiers of the key ring of the compromised sensor node.

The Distributed Sensor Network system of the present invention also includes processing means for reconfiguring communication links of the sensor node affected by revocation of the compromised sensor node. The processing means also includes means for computing the number of the sensor nodes sufficient to provide for fully connected Distributed Sensor Networks, and means for adding new sensor nodes.

In the random key pre-distribution scheme of the present invention, before sensor nodes are deployed, an initialization phase is performed. In the initialization phase, the random key pre-distribution scheme picks a random pool of P keys out of the total possible key space. For each node, k keys are randomly selected from the key pool P and stored into the sensor node's memory. This set of k keys is called the node's key ring. The number of keys in the key pool, |P|, is chosen such that two random subsets of size k in P will share at least one key with some probability p.

After the sensor nodes are deployed in a key-setup phase, any two neighboring nodes must find a single common key from their key rings to establish a secure communication link. The sensor nodes first perform key-discovery to determine which of their neighbors share a key. Such key discovery can be performed by assigning a short identifier to each key prior to deployment and having each sensor node broadcast its set of identifiers. Nodes which discover that they contain a shared key in their key rings then verify that their neighbor actually holds the key through a challenge-response protocol. The shared key then becomes the key for that link.

After key-setup is complete, a connected graph of secure links with DSN is formed. Nodes can then set up path keys with nodes in their vicinity whom they did not happen to share keys with in their key rings. If the graph is connected, a path can be found from a source node to its neighbor. The source node can then generate a path key and send it securely via the path to the target node.

One needs to pick the proper parameters such that the graph generated during the key-setup phase is connected. Consider a random graph $G(n, p_l)$, a graph of n nodes for which the probability that a link exists between any two nodes is $p_l$. For monotone properties of a graph $G(n, p_l)$, there exists a value of $p_l$ over which the property exhibits a "phase transition", i.e., it abruptly transitions from "likely false" to "likely true". Hence, it is possible to calculate some expected degree d for the vertices in the graph such that the graph is connected with some high probability c, for example, where c=0.999. In the scheme of the present invention, the necessary expected node degree d is calculated in terms of the size of the network n as:

$$d = \left(\frac{n-1}{n}\right)(\ln(n) - \ln(-\ln(c))) \quad (1)$$

From the formula, $d=\sigma(\log n)$. d is expected to be in the range of 10 to 30 for a network of 10,000-1,000,000 nodes.

For a given density of sensor network deployment, let n' be the expected number of neighbors within communication range of a node. Since the expected node degree must be at least d as calculated, the required probability of p of successfully performing key-setup with some neighbor is:

$$p = \frac{d}{n'} \quad (2)$$

Since the models of connectivity are probabilistic, there is always the chance that the graph may not be fully connected. This chance is increased if the deployment pattern is irregular or the deployment area has unpredictable physical obstacles to communication. It is difficult to anticipate such scenarios prior to understanding the specifics of the deployment area.

These features and advantages of the present invention will be fully understood and appreciated from the following detailed description of the accompanying Drawings.

DETAILED DESCRIPTION OF THE PREFERRED EMBODIMENTS

Figure 1:
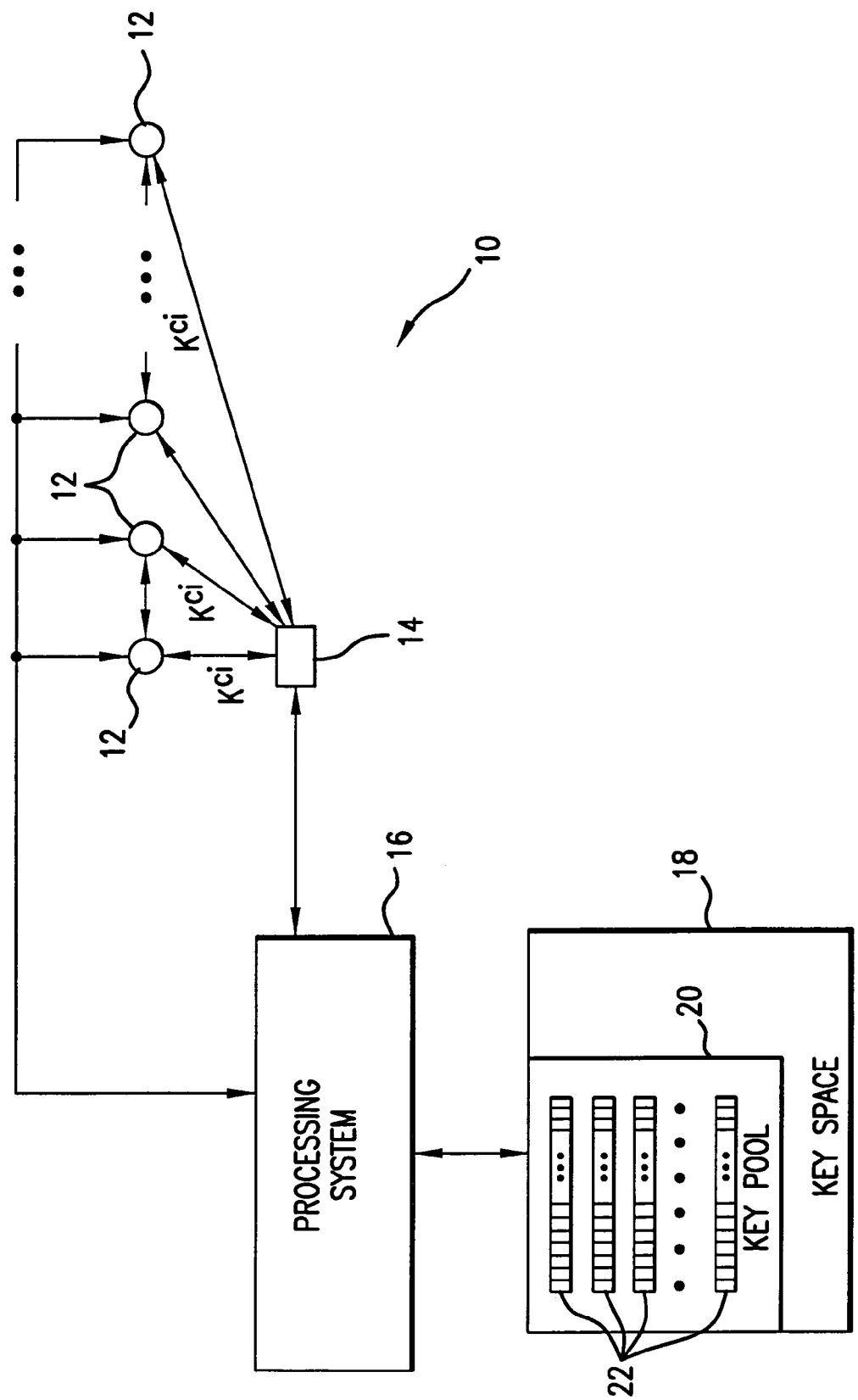
FIG. 1 shows schematically a Distributed Sensor Network system of the present invention in which a key managing scheme of the present invention is employed.

Referring to FIG. 1, a Distributed Sensor Network system 10 includes a plurality of sensor nodes 12 adapted for being deployed on a terrain under scrutiny for the purpose of real time traffic monitoring, security monitoring, military sensing and tracking, distributed measurement of phase connectivity, real-time pollution monitoring, wide light monitoring, wire tracking, etc. The DSN may include several thousands sensor nodes. Each sensor node has a low cost, limited in computation and information storage capacity, highly power constrained, and can communicate over a short range wireless network interface with other sensor nodes 12 or with controller nodes 14. The controller nodes 14 are equipped with sensor readers as well as adapted for bi-directional communication both with sensor nodes and the processing system which controls the functions and operations of the Distributed Sensor Network system 10. The controller nodes 14 are additionally equipped for performing broadcasting in a predetermined communication range.

The controller nodes 14 include data collection nodes, which read sensor data and make it available for processing to application components, such as for example processing system 16, of the Distributed Sensor Network, and controls nodes which monitor the status of, and broadcast to the sensor node 12. The sensor nodes 12 are deployed at the area under examination, and may remain in their positions during the DSN operation. Data collection and control nodes 14 opposingly are highly mobile since they usually are placed on humans, vehicles, aircraft, etc.

The sensor nodes 12 in each Distributed Sensor Network may reach a magnitude of tens of thousands of nodes. They are somewhat dynamic in the sense that they allow addition and deletion of sensor nodes after deployment to extend the network or to replace failing and unreliable (compromised) nodes without physical contact. The sensor nodes 12 may be deployed in hostile areas where communication is monitored and sensor nodes are subject to capture and mutilation by an adversary.

The Distributed Sensor Network system 10 of the present invention further includes a data base 18 containing the total possible key space. From this, the processing system 16 randomly selects a set (pool) 20. The processing system 16 further randomly selects subsets 22 from the key pool 20, each subset 22 also known as the key ring, selected for each sensor node 12. The number of keys in the key pool 20 is chosen such that two random subsets (key rings) 22 will share at least one key with some probability.

The Distributed Sensor Network 10 relies on the key management scheme based on probabilistic key sharing among the sensor nodes 12 of a random graph and uses a simple shared key discovery protocol for key distribution, revocation and node re-keying, as will be described in detail in following paragraphs.

Figure 2:
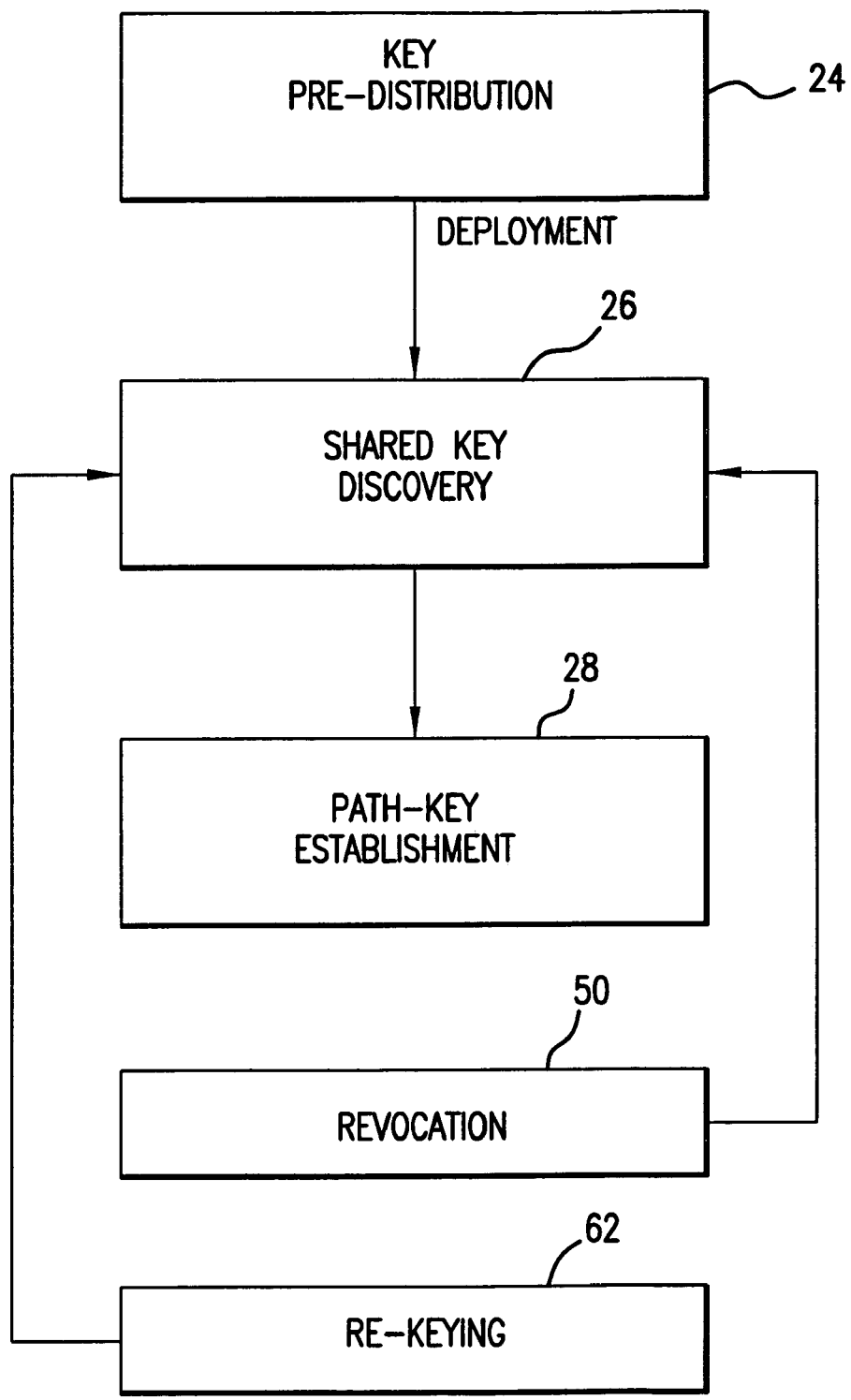
FIG. 2 is a block diagram showing the phases of the key management scheme of the present invention.
Figure 3:
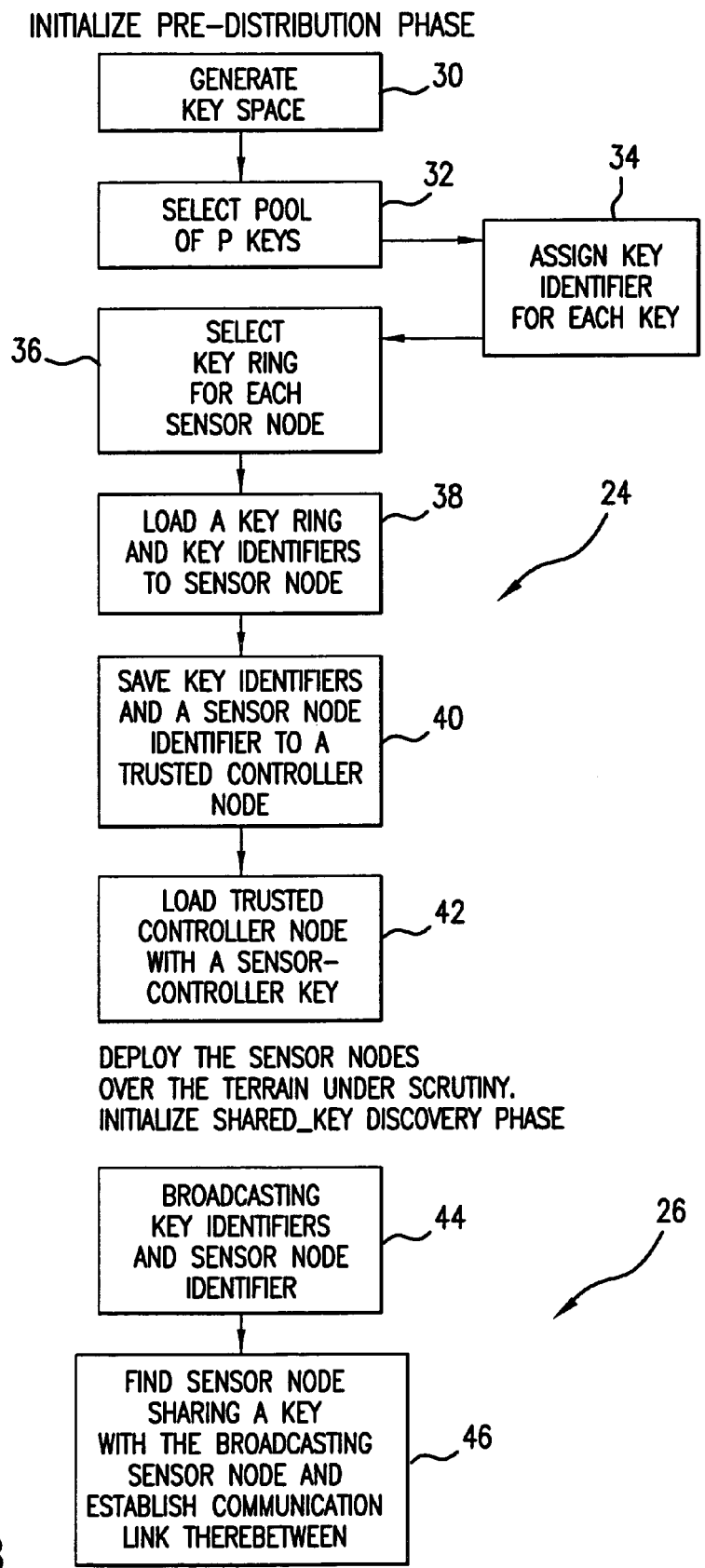
FIG. 3 is a block diagram illustrating in more detail the key distribution phase of the present invention.

In the key management scheme shown in FIG. 2, the key distribution consists of three phases, namely, key predistribution 24, shared key discovery 26, and path key establishment 28. Referring to FIGS. 1-3, the key distribution is initialized by generating the key space of the possible keys in the block 30 and forming the data base 18 therefrom. Further, the logic of the processing system 16 flows to the block 32 "Select a Pool of P Keys" where a large pool of P keys (e.g., $2^{17}$-$2^{20}$ keys), are randomly chosen from the key space. Each out of the P keys of the key pool 20 is further assigned with a specific key identifier in the block 34 "Assign Key Identifiers for Each Key". From the block 34, the flow chart moves to the block 36

"Select Key Ring for Each Sensor Node" where keys are randomly drawn from the pool 20 without replacement to establish a specific key ring 22 for each sensor node 12. At this stage of the key management scheme, due to the random choice of keys on the key rings, a shared key may not exist between some pairs of sensor nodes. Although a pair of sensor nodes may not share a key, if a path of nodes sharing keys pair-wise exists between the two nodes at the network initialization, the pair of nodes can use that path to exchange a key that establishes a direct link. A random graph analysis and simulation are used to show that what really matters in key pre-distribution is the shared key connectivity of the resulting network as will be presented infra. For example, it will be shown that in order to establish "almost certain" shared key connectivity for 10,000 node network, a key ring of only 250 keys has to be pre-distributed to every sensor node where the keys were drawn out of a pool of a hundred thousand keys, leaving a substantial number of keys available for DSN expansion, as will be described in further paragraphs. It will further be shown that the security connectivity of probabilistic key pre-distribution based on random graphs are suitable for solving other key management problems of DSNs, such as selective revocation of a node's keys, node re-keying, and incremental addition/deletion of the sensor nodes.

After the key rings 22 are formed, each key ring, as well as the key identifiers of the keys on the key ring, are loaded into the memory of a respective sensor node, as presented in block 38 of FIG. 3. From the block 38, the logic moves to the box 40 "Save Key Identifiers and Sensor Identifier to a Trusted Controller Node", where a respective controller node 14 is loaded with the key identifiers of the keys on a key ring and the sensor identifier of each sensor node 12 in the network. After the key identifiers and sensor identifiers are saved in the trusted controller node, the flow chart moves to the block 42 "Load the Trusted Controller Node with a Sensor-Controller Key", where, for each sensor node, the associated controller node is loaded with the key shared by the controller node and the sensor node. Thus, the sensor-controller keys are present both in the sensor nodes and the controller node.

The key shared by a sensor node with an $i^{th}$ controller node, $K^{ci}$, can be computed as $$K^{ci}=E_{Kx}(ci), \quad (3)$$

where $K_x=K_1, \oplus, \ldots \oplus K_K$, where $K_i$ are the keys of the sensor node's key ring, ci is the controller node's identity, and $E_{Kx}$ denotes encryption with the sensor node's key $K_x$.

Hence, the keys shared by a sensor node with a controller node, which are only infrequently used, need not take any space on the key ring. However, in this case, a $K^{ci}$ would change upon any key change on a key ring.

As will be shown in following paragraphs, the key pre-distribution phase insures that only a small number of keys need to be placed on a sensor node's key ring to insure that any two nodes share at least a key with a chosen probability; e.g., for a probability of 0.5, only 75 keys drawn out of the key pool having ten thousand keys need to be on any key ring.

The second phase of the key distribution scheme of the present invention, e.g. shared-key discovery phase, takes place during DSN initialization in the operational environment upon deployment of the sensor nodes, where every node discovers its neighbors in wireless communication range with which it shares keys. The simplest way for any two sensor nodes to determine if they share a key, is by broadcasting, in clear text, the list of identifiers of the keys on the sensor node's key ring. This approach does not give an adversary any attack opportunity that does not already exist. For example, if an adversary captures a node, he can discover which key of that sensor node is used for which link by decrypting communications; and if he does not capture a sensor node, the adversary can mount a traffic analysis attack in the absence of key identifiers.

Therefore, after the sensor nodes are deployed over the terrain under scrutiny, the shared key discovery phase is initialized by broadcasting from each sensor node the key identifiers of the key ring and the sensor identifier as shown in block 44 of FIG. 3. Instead of broadcasting in clear text, alternate methods exist which hide key sharing patterns among sensor nodes from an adversary, thereby establishing private shared key discovery. These methods force an adversary to conduct traffic analysis to discover the pattern of key sharing. For example, for every key on a key ring, each sensor node could broadcast a list of $$\alpha, E_{Ki}(\alpha), i=1, \ldots, k, \quad (4)$$

where $\alpha$ is a challenge. The decryption of $E_{Ki}(\alpha)$ with the proper key by a recipient which would reveal the challenge $\alpha$ and establish a shared key with the broadcasting node.

From the block 44, the logic moves to block 46 "Find a Sensor Node Sharing a Key with the Broadcasting Sensor Node and Establish Communication Link Therebetween". The shared key discovery phase establishes the topology of the sensor array. A link exists between two sensors nodes only if they share a key; and if a link exists between two nodes all communication of that link is secured by link encryption. It is possible that the same key is shared by more than a pair of sensor nodes, since the key rings consist of keys drawn randomly from the same pool of keys. This does not cause a link-security exposure since, in normal mode of operation, sensor nodes "trust" each other and during the revocation phase following node capture detection (to be described in detail in further paragraphs), revocation of a captured node's key ring insures that the small set of keys in this key ring are removed network-wide.

The fact that all the sensor nodes trust each other implies that all pairs of nodes sharing at least a key can authenticate messages from each other using an authentication key derived from the shared key. The authentication key is obtained by performing a hash operation on the concatenation between the shared key and the two sensor identifiers, where the two sensor identifiers are concatenated in the order of their distinct values, i.e., either increasing order or decreasing order. The hash operation is performed using any of the standard hash functions commonly used in practice (e.g., MD5, SHA-1). Using the authentication key, two sensors can compute and verify message authentication codes (MACs) that ensure message authenticity in a manner that is well-known in the art (e.g., compute and verify CBC-MAC, HMAC, XOR-MAC).

Referring again to FIG. 2, the path key establishment phase 28 assigns a path key to selected pairs of sensor nodes in wireless communication range that do not share a key but are connected by two or more links at the end of the shared key discovery phase 26. Path keys need not be generated by the sensor nodes.

The design of the DSN system of the present invention insures that, after the shared key discovery phase is finished, a number of keys on a key ring are left unassigned to any link. For example, both analysis and simulations of the key management scheme of the present invention show that even without special provisioning, a substantial number of keys are left unused on the key ring. Provisioning for sufficient ring keys that are left unassigned by the determination of key ring size k can also anticipate both the effects of revocation and those of incremental addition of new sensor nodes. This is true since both may require the execution of the path key establishment phase after the shared key discovery phase.

Figure 4:
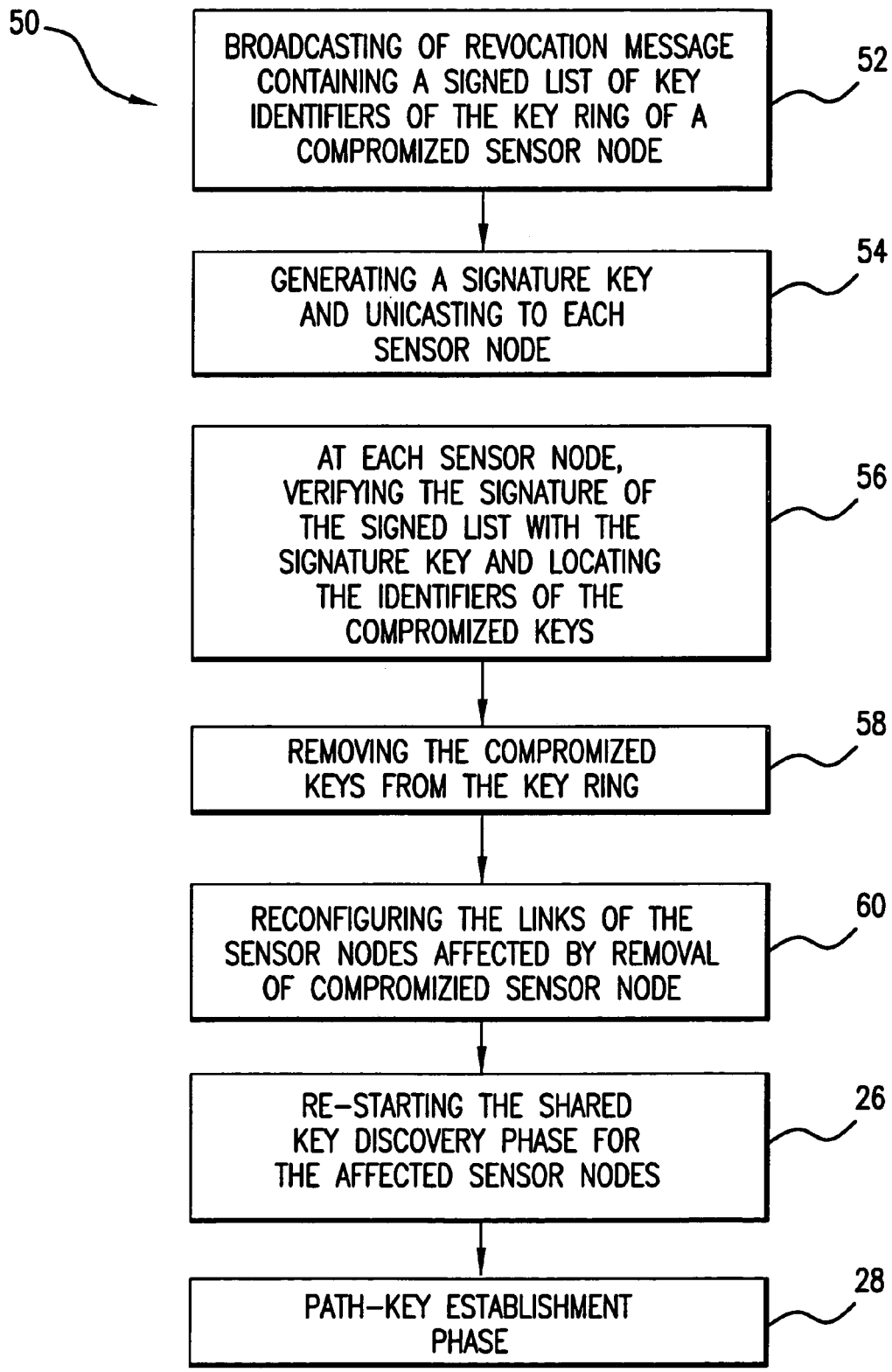
FIG. 4 is a block diagram illustrating the revocation phase of the key management scheme of the present invention.

Whenever a sensor node is compromised, it is important to be able to revoke the entire key ring of the compromised sensor node. Therefore, the revocation phase 50, shown in FIGS. 2 and 4, is included in the overall key management scheme of the present invention. To effect the revocation, a controller node 14 (which has a large communication range and may be mobile) broadcasts a single revocation message containing a signed list of k key identifiers of the key ring to be revoked, as shown in the block 52 of FIG. 4. In order to sign the list of key identifiers, the logic moves to block 54, where the controller node generates a signature key $K_e$ and unicasts it to each sensor node by encrypting it with a key $K^{ci}$, which is the key shared by the $i^{th}$ controller node with each sensor node during key predistribution phase. Further, the logic flows to block 56, where after obtaining the signature key $K_e$, each sensor node verifies the signature of the signed list of key identifiers and locates the identifiers of the compromised keys in its key ring. Upon performing this operation, the flow moves to the block 58 "Removing the Compromised Keys from the Key Ring" where the compromised keys (if any) are removed from the key ring of the sensor node.

Once the keys are removed from the key rings, some links may disappear and the affected sensor nodes must reconfigure those links. For this purpose, the logic moves to block 60 "Reconfiguring the Links of the Sensor Nodes Affected by Removal of the Compromised Sensor Node". The affected sensor nodes need to reconfigure those links by restarting the Shared Key Discovery phase of affected sensor nodes, and possibly the Path Key Establishment phase, as best shown in FIGS. 2 and 4. Since only k out of P keys are removed from the pool for every revoked sensor node, the revocation affects only a few other nodes and a small portion of their key ring, however, it disables all connectivity of the compromised sensor nodes.

Figure 5:
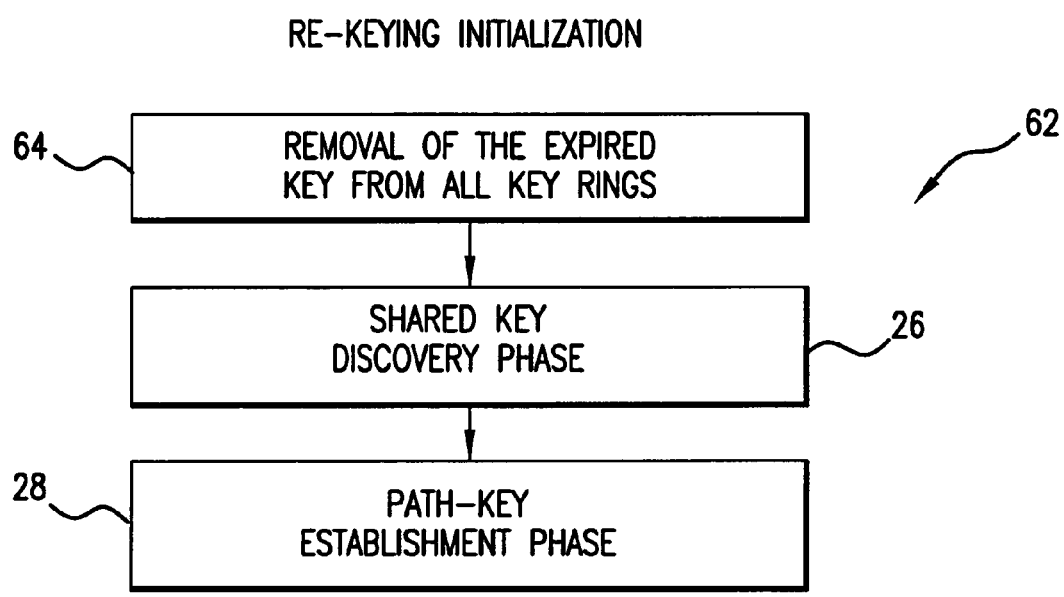
FIG. 5 is a block diagram illustrating the re-keying phase of the key management scheme of the present invention.

Although it is anticipated that in most Distributed Sensor Networks, the lifetime of a key shared between two sensor nodes exceeds that of the two sensor nodes, it is possible that in some cases, the lifetime of keys expires and re-keying must take place. Re-keying is equivalent with a self-revocation of a key by a sensor node. The re-keying phase 62 of the key management scheme of the present invention is shown in FIGS. 2 and 5. Since re-keying is a self-revocation of a key from a key ring, it does not involve any network-wide broadcast message from a controller node and hence is especially simple. As shown in FIG. 5, the Re-keying 62 starts in block 64 by removal of the expired key from all key rings after which the logic flows to block 26 "Shared Key Discovery Phase" for affected sensor nodes, and possibly proceeds further to the Path Key Establishment phase 28.

The unattended operation of sensors in hostile areas raises the possibility of sensor-node capture by an adversary. Although node capture is a general threat that affects all security mechanisms (not just a node's key ring), it is worth examining the resiliency of a key management scheme of the present invention to such a threat.

There is a distinction between two levels of threats posed by node capture and potential countermeasures. The first is that of active manipulation of a sensor's data-inputs. Although this threat does not necessarily require a physical attack against a sensor, it further does not imply that an adversary can disseminate bogus data in the DSN. Such an attack cannot usually be prevented and it may not be practical, or even possible, to detect it by physical DSN surveillance (e.g., by satellite or aerial imagery).

In general, detection of such attacks is especially difficult since sensor nodes may not necessarily communicate in an erratic or anomalous manner. Hence, traditional anomaly-detection techniques may not apply. Detecting a sensor's data input manipulation may require data correlation analysis and data-anomaly detection, possibly off-line, by collection and processing nodes. While such analysis can detect active insertion of bogus data by an adversary, it requires redundant sensor coverage of deployment areas and, hence, sufficient sensor-node density in the DSN.

The second level of threat materializes when a sensor node is under the complete physical control of the adversary. This level includes the first level, and in addition enables an adversary to mount attacks against other sensors of the DSN. For example, an adversary can launch a "sleep-deprivation attack" by excessive communication that may exhaust the batteries of the sensor nodes with whom the captured node shares keys. Handling sensor-node capture typically requires that tamper-detection technologies (IBM, IBM 4758 General Information Manual, available at http://www.ibm.com/security/cryptocards/, as well as S. R. White and L. Comferford, "ABYSS: An Architecture for Software Protection", IEEE Transactions on Software Engineering, Vol. 16, No. 6, June 1990, pp. 619-629, and F. Stajano, Security for Ubiquitous Computing, John Wiley and Sons, New York, Feb. 12, 2002, ISBN: 0-470-84493-0, 267 pp.) be used to shield sensors in such a way that physical sensor manipulation would cause the erasure of the sensor's key ring and the disabling of the sensor's operation. For some sensor designs, it may be practical to encrypt a node's key ring in a key-encrypting key whose erasure is rapid.

Although tamper-detection via sensor-node shielding that erases the keys of captured nodes is assumed, it is emphasized that key-distribution scheme of the present invention is more robust than those based on a single mission key or on pair-wise private sharing of keys even in the face of physical attacks against captured unshielded sensor nodes. In the single mission key scheme, all communication links are compromised, whereas in the pair-wise private key sharing, all n−1 links to the captured unshielded node are compromised. In contrast, in the scheme of the present invention only the k<<n keys of a single ring are obtained, which means that the attacker has a probability of approximately $$\frac{k}{P}$$

to attack successfully any DSN link (viz., simulation results presented infra). The node's shared keys with controllers may also be re-created by the adversary, however, this does not affect any other sensor nodes.

The limits of the wireless communication ranges of sensor nodes, not just the security considerations, preclude use of DSNs that are fully connected by shared-key links between all sensor nodes. For example, two nodes that are not in wireless communication range cannot take advantage of their shared key in a fully connected network. Moreover, it is unnecessary for the shared-key discovery phase to guarantee full connectivity for a sensor node with all its neighbors in wireless communication range, as long as multi-link paths of shared keys exist among neighbors that can be used to setup a path key as needed. Further, extra shared-key provisioning is required for incremental network growth and, possibly, for path-key establishment following revocation and re-keying.

Let p be the probability that a shared key exists between two sensor nodes, n be the number of network nodes, and d=p*(n−1) be the expected degree of a node (i.e., the average number of edges connecting that node with its graph neighbors). To establish DSN shared-key connectivity, the following questions need to be answered:

what value should the expected degree of a node, d, have so that a DSN of n nodes is connected? and, given d and the neighborhood connectivity constraints imposed by wireless communication (e.g., the number of nodes n' in a neighborhood), what values should the key ring size, k, and pool, P, have for a network of size n? In particular, if memory capacity of each sensor node limits the key ring size to a given value of k, what should the size of the key pool, P, be?

Random-graph theory facilitates answer the first question. A random graph G(n, p) is a graph of n nodes for which the probability that a link exists between two nodes is p. When p is zero, the graph does not have any edge, whereas when p is one, the graph is fully connected. The first question of interest is what value should p have such that it is "almost certainly true" that the graph G(n, p) is connected.

It has been shown, that, for monotone properties, there exists a value of p such that the property moves from "nonexistent" to "certainly true" in a very large random graph. The function defining p is called the threshold function of a property. Given a desired probability $P_c$ for graph connectivity, the threshold function p is defined by:

$$P_c = \lim_{n \to \infty} Pr[G(n, p) \text{ is connected}] = e^{e^{-c}} \quad (5)$$

where $$p = \frac{\ln(n)}{n} + \frac{c}{n}$$

and c is any real constant.

Therefore, given n, the p and d=p*(n−1) can be found for which the resulting graph is connected with desired probability $P_c$.

Figure 6:
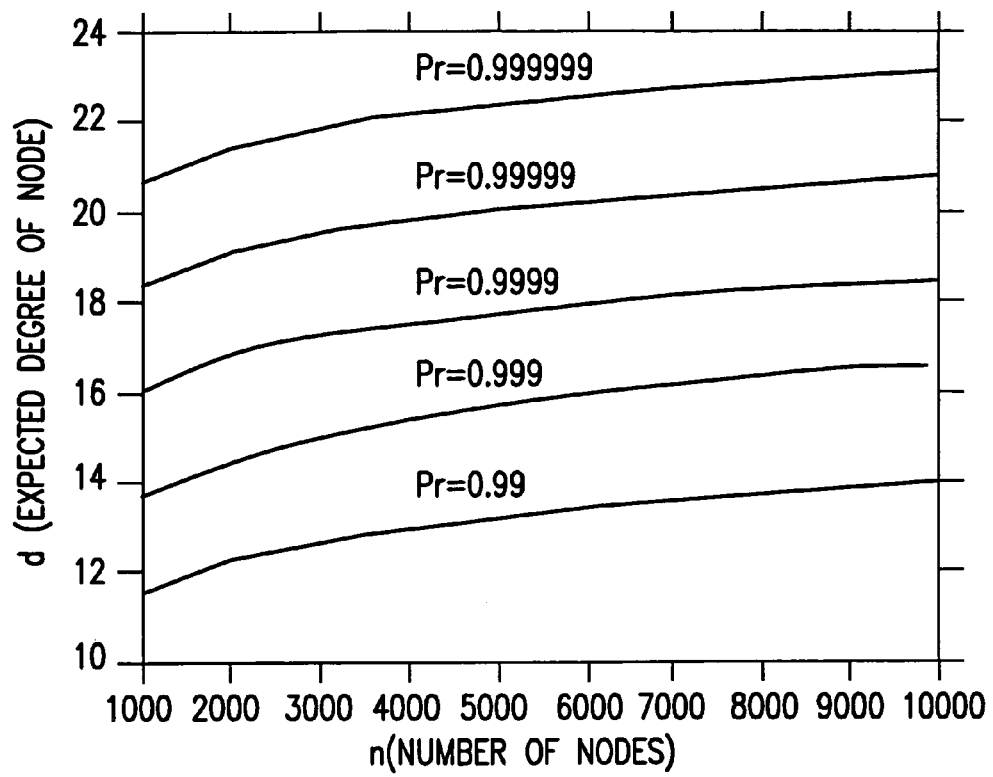
FIG. 6 is a diagram showing the expected degree of a node as a function of the network size for various sizes of a key pool.

FIG. 6 illustrates the plot of the expected degree of a node, d, as a function of the network size, n, for various values of $P_c$. This figure shows that, to increase the probability that a random graph is connected by one order, the expected degree of a node increases only by 2. Moreover, the curves of this plot are almost flat when n is large, indicating that the size of the network has insignificant impact on the expected degree of a node required to have a connected graph.

To answer the second question above, it is noted that the wireless connectivity constraints may limit neighborhoods to n'<<n, which implies that the probability of sharing a key between any two nodes in a neighborhood becomes $$p' = \frac{d}{(n'-1)} \gg p.$$

Hence, the probability is set that two nodes share at least one key in their key rings of size k chosen from a given pool of P keys to p' and then P is derived as a function of k. This derivation takes into account that the size of the key pool, P, is not a sensor-design constraint. In contrast with k, which is limited by the sensor memory size, the key pool is generated and used off-line and hence its size, P, may be very large. To derive the value of P, given constraint k for a p' that retains DSN connectivity with an expected node degree d, it is noted that p'=1−Pr (two nodes that do not share any key). To compute the probability that two key rings do not share any key, it is noted that each key of a key ring is drawn out of a pool of P keys without replacement. Thus, the number of possible key rings is:

$$\frac{P!}{k!(P-k)!} \quad (6)$$

The first key ring is chosen. The total number of possible key rings that do not share a key with this key ring is the number of key rings that can be drawn out of the remaining P−k unused key in the pool, namely:

$$\frac{(P-k)!}{k!(P-k)!} \quad (7)$$

Therefore, the probability that no key is shared between the two rings is the ratio of the number of rings without a match by the total number of rings. Thus, the probability that there is at least a shared key between two key rings is:

$$\frac{k!(P-k)!(P-k)!}{P!k!(P-2k)!} \quad (8)$$

Thus, $$p' = 1 - \frac{((P-k)!)^2}{(P-2k)!P!} \quad (9)$$

Since P is very large, Stirling's approximation for n! is used:

$$n! \approx \sqrt{2\pi n^{n+\frac{1}{2}}} \, e^{-n} \quad (10)$$

By simplifying the expression of p', obtain:

$$p' = 1 - \frac{\left(1 - \frac{k}{P}\right)^{2(P-k+\frac{1}{2})}}{\left(1 - \frac{2k}{P}\right)^{(P-2k+\frac{1}{2})}} \quad (11)$$

Figure 7:
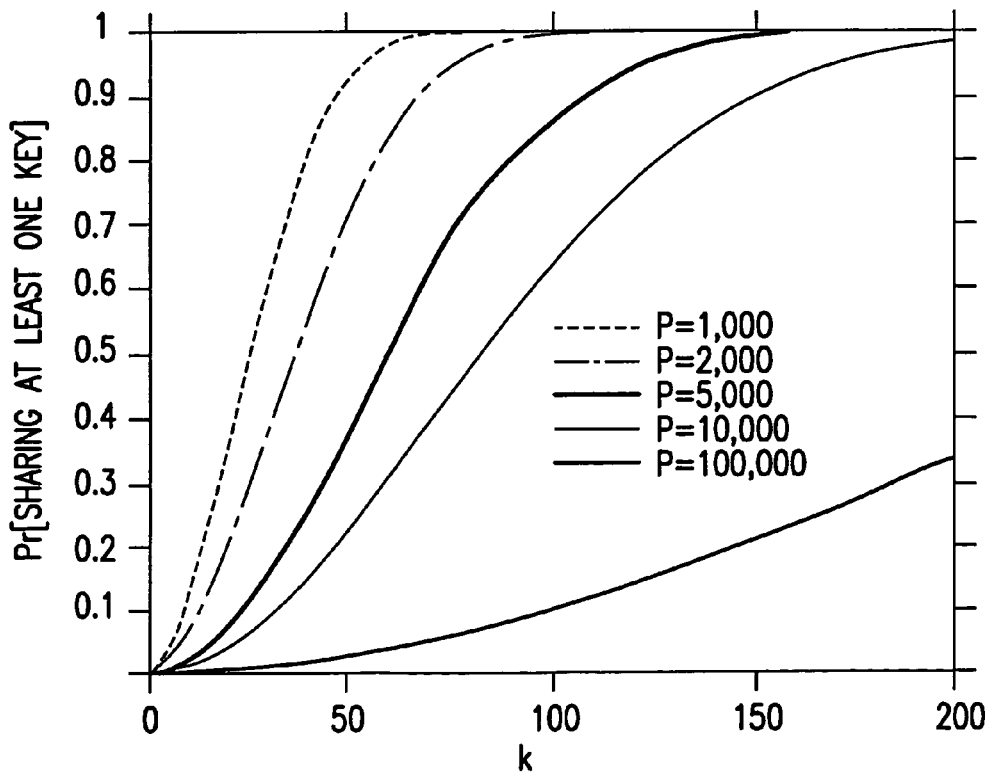
FIG. 7 is a diagram illustrating a probability of sharing at least one key between two sensor nodes.

FIG. 7 illustrates a plot of this function for various values of P. For example, one may see that for a pool size P=10,000 keys, only 75 keys need to be distributed to any two nodes to have the probability p=0.5 that they share a key in their key ring. If the pool is ten times larger, namely P=100,000, the number of keys required is 250, which is only 3.3 times the number of keys distributed in the case P=10,000. This provides intuition for the scalability of the approach of the present invention. To determine the final size of the key ring, provision is needed for addition of new nodes, revocation and re-keying. The scalability properties of the solution indicate that such provisioning will have minimal impact on the size of key rings.

To understand how the key management scheme of the present invention works, a simple numerical example is presented. Assume that a DSN has n=10,000 nodes and that the resulting network is wanted to be connected with probability $P_c$=0.99999. This means the network will "almost certainly" be connected. Further, assume that each node in the DSN has a wireless communication range that requires a neighborhood connectivity of 40 nodes.

Using the formula supra, it is found c=11.5. For this value of c, p=$2*10^{-3}$ and d=$2*10^{-3}*9999$ are obtained. It follows that if in the network each node can communicate with, on the average, 20 other nodes out of the n=10,000 nodes, the network will be (almost certainly) connected. The formula of p' supra shows that if to set p'=p=$2*10^{-3}$ and to select an especially small value of k, for example, k=15, a pool size must be P=100,000 (as shown in FIG. 7). Larger values of k can be accommodated by a pool size P=100,000, as will be presented infra.

The requirement that each neighborhood consists of n=40 sensor nodes, implies that instead of p=$2*10^{-3}$, p' will be:

$$p' = \frac{d}{n'-1} = \frac{20}{40-1} \approx 0.5.$$

This means that either the size of the key ring, k, or the pool size, P, or both, must increase. For example, the formula for p' supra indicates that the key ring size k is to be increased from 15 to 250 if the same pool size P=100,000 is intended to be used. Furthermore, if the neighborhood size is increased to n'=60, then $$p' = \frac{20}{60-1} \approx 0.33.$$

The formula for p' supra indicates that only a key ring size of k=200 for a pool size of P=100,000 keys is now needed.

Simulation was used to investigate the effect of the various parameters on different DSN sizes. Of particular interest are the efficiency and scalability of the scheme of the present invention and also the determination of some parameter values that cannot be easily computed, such as the diameter of the resulting secure network.

The simulations assumed a network of 1,000 nodes with an average density of 40 sensor nodes in a neighborhood. Each simulation was run 10 times with different seeds for the random number generator, and the results presented herein represent the average values on the 10 runs.

Figure 8:
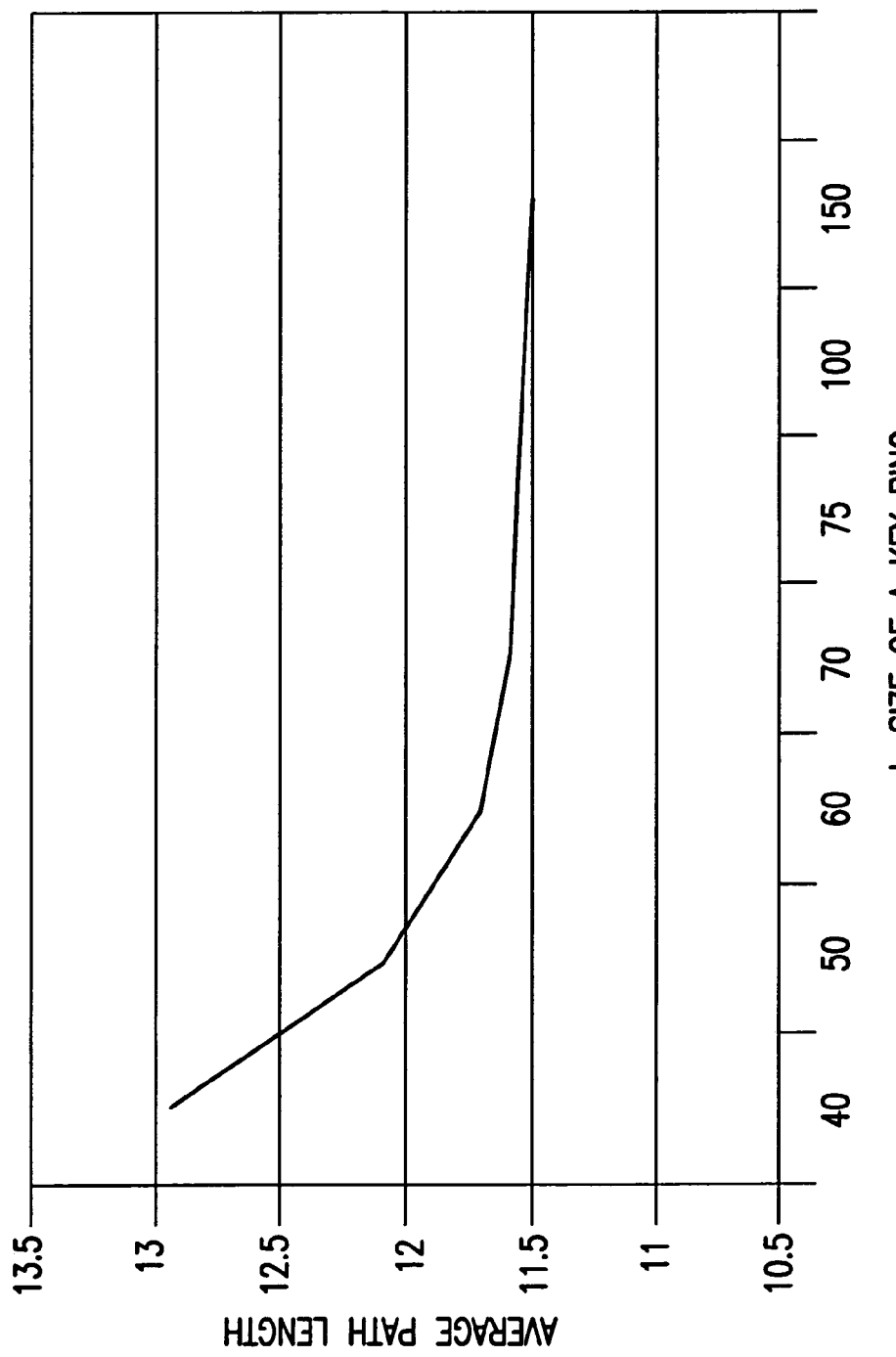
FIG. 8 is a diagram showing average path length (the number of links) between two nodes after shared key discovery phase computed for various sizes of the key rings.

The fact that two nodes may not share a key during the shared-key discovery phase means that, from a network router's point of view, a link does not exist between those two nodes. This has an effect on the average path length (i.e., the number of links) between two nodes after shared-key discovery. This value for various sizes of the key ring was computed and the result was shown in FIG. 8. This figure indicates that the average path length of the network depends on the size of the key ring. The smaller k is the higher the probability that a link does not have a key and, therefore, longer paths need to be found between nodes. In this example, the network gets disconnected for small k.

Because some links may not be keyed, a node may require a multi-link path to communicate with one of its wireless neighbors. Although this path would be used only once (to send the key to use for the link encryption), it should not be excessively long; otherwise the delay and communication cost to setup a path key with a neighbor may be high. In this example, it is shown how the multi-link path from a node to one of its neighbor varies with k.

Figure 9:
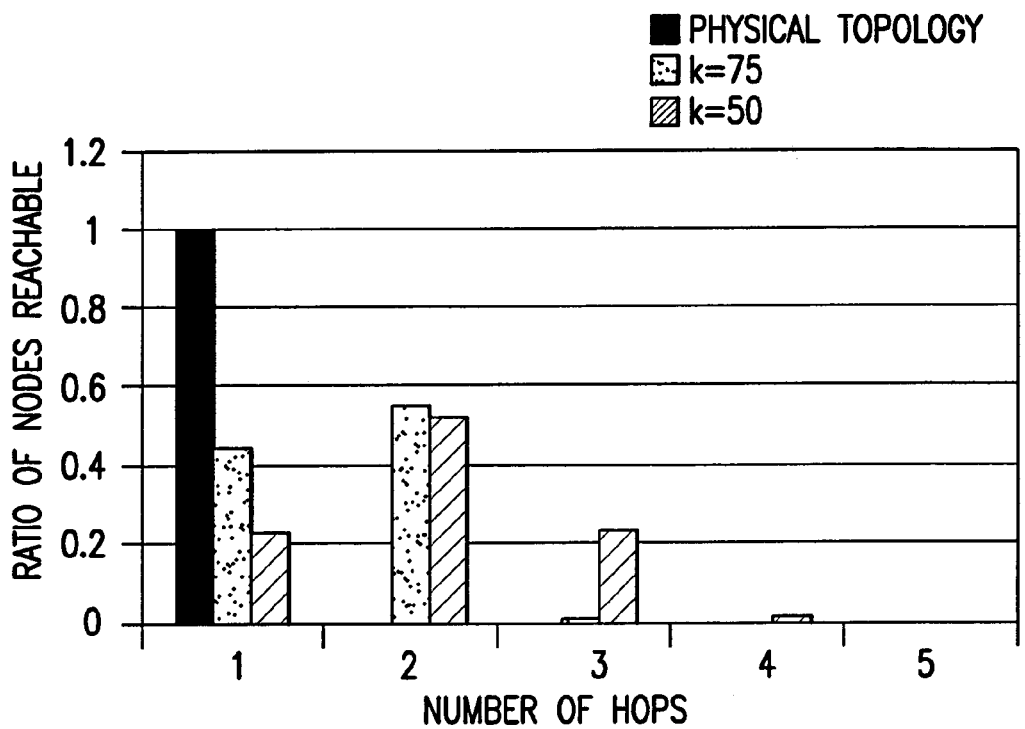
FIG. 9 is a diagram illustrating ratio of nodes reachable via a shared key vs. the number of links; and, FIG. 10 is a diagram representing a usage of the keys from the key pool.

FIG. 9 shows that the effect of traversing multiple links (hops) to set up a path key is negligible. If a neighborhood node cannot be reached via a shared key (i.e., one link or one hop), it will take at most two or three links to contact it. Since this has to be done only once to setup the path key, the effects are negligible. With k=75, only half of the neighbors are reachable over a single link, but most of the other may be reachable over in three-link paths. While for k=50, only one third of the nodes are reachable over a single link, but at most four links are needed for a path to contact all of them.

It was suggested that capture of an unshielded node leads to the compromise of only k keys and that an adversary could only attack $$\frac{k * \text{number of links}}{P}$$

links. This fact was verified by observing how many keys are used to secure links in the simulated DSN and how many links are secured with the same key.

Figure 10:
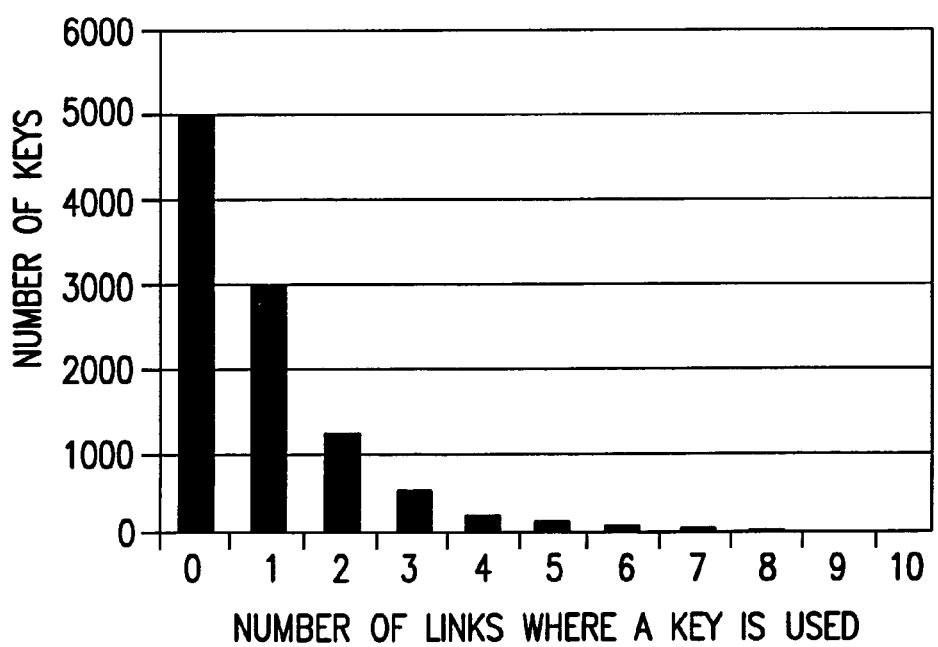

FIG. 10 shows that, out of the pool of 10,000 keys, only 50% of the keys are used to secure links, only 30% are used to secure one link, 10% are used to secure two links, and only 5% are used to secure 3 links. This suggests that compromise of one key leads to the compromise of another link with probability 0.3, of two other links with probability 0.1, and so on.

A new key management scheme for large-scale DSNs as described supra, is extremely simple given the sensor-node computation and communication limitations. It is also scalable and flexible: trade-offs can be made between sensor-memory cost and connectivity, and design parameters can be adapted to fit the operational requirements of a particular environment. The effect of modifying design parameters using both analysis and simulations was illustrated, the results of which indicate that the key management scheme is superior to the traditional key pre-distribution schemes.

Although this invention has been described in connection with specific forms and embodiments and thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A method of key-management in Distributed Sensor Networks, comprising the steps of:
   prior to deployment of a plurality of sensor nodes of the Distributed Sensor Network, storing a respective key ring including a plurality of individually selectable private keys in each sensor node of the Distributed Sensor Network, said private keys being randomly chosen from a common pool, said key rings of at least a pair of said sensor nodes having a pre-defined probability of having at least one private key in common;
   wherein the step of storing a respective key ring further includes the steps of:

generating a key space having a multiplicity of keys,
randomly selecting a pool of keys from said key space,
assigning a specific key identifier for each key in said pool of keys,
randomly selecting a number of the keys from said pool of keys to form said respective key ring for each sensor node, said number of keys being probabilistically determined to provide said pre-defined probability of said pair of sensor nodes having at least one shared private key, and
storing said specific key identifier with said respective key ring in each said sensor node;
deploying said plurality of the sensor nodes of the Distributed Sensor Network;
actuating at least one sensor node to discover at least another sensor node sharing said at least one private key to establish a secure communication link between said one sensor node and another of said sensor nodes; and
using said at least one shared private key for subsequent secure communication between said at least one sensor node and said other sensor node.

2. The method of claim 1, wherein the step of deploying is preceded by the step of: assigning to each said sensor node a specific sensor identifier.

3. The method of claim 2, where the step of actuating includes the step of: broadcasting said key identifiers with said specific sensor identifier associated with said at least one sensor node to discover said at least another sensor node and establish a link therewith.

4. The method of claim 2, wherein the step of deploying is preceded by the steps of:
providing a controller node to securely communicate with a plurality of said sensor nodes for collecting data therefrom;
storing said key identifiers of the keys in said respective key ring of each said sensor node along with said sensor identifier of said each sensor node on said controller node.

5. The method of claim 3 wherein said key identifiers are broadcast in a clear text.

6. The method of claim 3, wherein said key identifiers are broadcast in a hidden pattern.

7. The method of claim 4, further comprising the steps of: computing a plurality of sensor-controller keys respectively shared by said plurality of sensor nodes with said controller node, and loading said controller node and each of said sensor nodes with an associated one of said sensor-controller keys.

8. The method of claim 4, further comprising the steps of: upon compromising of at least one sensor node, revoking said at least one compromised sensor node by broadcasting from said controller node a revocation message containing a signed list of the key identifiers of the key ring of said compromised sensor node to be revoked.

9. The method of claim 8, further comprising the steps of: generating a signature key for said list and unicasting the same to each said sensor node.

10. The method of claim 9, further comprising the steps of: upon obtaining of said signature key by an uncompromised sensor node, verifying said signature key of said signed list of the key identifiers of the key ring of said compromised sensor node, locating said key identifiers in said key ring of said uncompromised sensor node, and removing keys corresponding to the key identifiers of the compromised keys from said key ring of said uncompromised sensor node.

11. The method of claim 8, further comprising the steps of: reconfiguring the communication links of the sensor nodes affected by revocation of said compromised sensor node.

12. The method of claim 1, further comprising the steps of: upon expiration of at least one key shared by said at least one and the other sensor node, removal of said expired at least one key from said key rings of said at least one and the other sensor nodes, and searching for another key common for said at least one and the other sensor nodes to establish a new communication link therebetween.

13. The method of claim 1, further comprising the steps of: generating a connectivity random graph for said Distributed Sensor Network, and computing the number of the sensor nodes, the number of keys in said pool of keys and the size of each said key ring, sufficient to provide for a connected Distributed Sensor Network.

14. The method of claim 1, further comprising the step of: assigning a path-key to a selected pair of sensor nodes connected by at least two communication links.

15. A Distributed Sensor Network system, comprising:
at least two sensor nodes, each said sensor node being pre-loaded prior to deployment thereof with a respective key ring including a plurality of individually selectable private keys randomly chosen from a common pool, the key rings of at least a pair of said sensor nodes having a pre-defined probability of having at least one private key in common, each of said private keys of said key ring having an associated key identifier stored in a corresponding sensor node; each of said sensor nodes having means for searching for another sensor node where a plurality of said key identifiers are broadcast to search for other sensor nodes with a matching of at least one of the key identifiers, said matching key identifier indicating the other sensor node has a private key in common therewith to establish a secure communication link therebetween;
means for generating a key space having a multiplicity of keys, means for randomly selecting a pool of keys from said key space, means for assigning a specific key identifier for each key of said pool of keys, and means for randomly selecting a distinct set of private keys from said pool of keys for each said sensor node to thereby form said respective key rings for said sensor nodes.

16. The Distributed Sensor Network system of claim 15, further comprising: at least one controller node for secure communication with at least one of sensor nodes, said at least one controller node having said key identifiers of said key ring of said at least one sensor node and a specific sensor identifier of said at least one sensor node saved therein, and a sensor-controller key stored therein and respectively stored in a corresponding sensor node.

17. The Distributed Sensor Network system of claim 16, further comprising means for generating a revocation message and broadcasting the same for revocation of a compromised at least one of said two sensor nodes, said revocation message containing a signed list of said key identifiers of said key ring of said compromised sensor node.

18. The Distributed Sensor Network system of claim 17, further comprising means for reconfiguring communication links of said at least another sensor node affected by revocation of said compromised sensor node.

19. The Distributed Sensor Network system of claim 15, further comprising means for assigning a path-key to a selected pair of sensor nodes connected by at least two communication links.

* * * * *